United States Patent
Small et al.

(10) Patent No.: US 6,866,792 B2
(45) Date of Patent: Mar. 15, 2005

(54) COMPOSITIONS FOR CHEMICAL MECHANICAL PLANARIZATION OF COPPER

(75) Inventors: Robert J. Small, Dublin, CA (US); Maria Peterson, Belmont, CA (US); Tuan Truong, San Jose, CA (US); Melvin Keith Carter, Los Gatos, CA (US); Lily Yao, Newark, CA (US)

(73) Assignee: EKC Technology, Inc., Hayward, CA (US)

( * ) Notice: Subject to any disclaimer, the term of this patent is extended or adjusted under 35 U.S.C. 154(b) by 0 days.

(21) Appl. No.: 10/017,934

(22) Filed: Dec. 12, 2001

(65) Prior Publication Data

US 2003/0164471 A1 Sep. 4, 2003

(51) Int. Cl.$^7$ .................... C09K 13/00; C09K 13/06
(52) U.S. Cl. .................. 252/79.1; 252/79.4; 438/692
(58) Field of Search ............... 252/79.1, 79.4; 438/692

(56) References Cited

U.S. PATENT DOCUMENTS

| | | | |
|---|---|---|---|
| 3,137,600 A | 6/1964 | Margulies et al. | 216/106 |
| 3,385,682 A | 5/1968 | Lowen | 438/693 |
| 3,410,802 A | 11/1968 | Radimer et al. | 252/79.1 |
| 3,592,773 A | 7/1971 | Müller | 438/747 |
| 4,013,758 A | 3/1977 | Osborg | 423/407 |
| 4,556,449 A | 12/1985 | Nelson | 216/108 |
| 4,724,042 A | 2/1988 | Sherman | 216/90 |
| 5,225,034 A | 7/1993 | Yu et al. | 438/693 |
| 5,340,370 A | 8/1994 | Cadien et al. | 51/308 |
| 5,354,490 A | 10/1994 | Yu et al. | 252/79.1 |
| 5,439,551 A * | 8/1995 | Meikle et al. | 156/626.1 |
| 5,527,423 A | 6/1996 | Neville et al. | 438/693 |
| 5,575,837 A | 11/1996 | Kodama et al. | 106/3 |
| 5,614,444 A | 3/1997 | Farkas et al. | 438/693 |
| 5,735,963 A | 4/1998 | Obeng | 134/3 |
| 5,770,517 A | 6/1998 | Gardner et al. | 438/627 |
| 5,780,358 A | 7/1998 | Zhou et al. | 438/645 |
| 5,840,629 A | 11/1998 | Carpio | 438/645 |
| 5,858,813 A | 1/1999 | Scherber et al. | 438/692 |

(List continued on next page.)

FOREIGN PATENT DOCUMENTS

| | | |
|---|---|---|
| JP | 52081692 | 9/1993 |
| WO | 98/04646 | 2/1998 |
| WO | 98/10050 | 3/1998 |
| WO | WO 03/040252 | 5/2003 |

OTHER PUBLICATIONS

Notification of Transmittal of the International Search Report of the Declaration in International Application No. PCT/US 02/39080 of EKC Technology, Inc.

International Preliminary Examination Report, mailed Jun. 3, 2004, in International Application No. PCT/US02/39080 of EKC Technology, Inc.

*Primary Examiner*—Nadine G. Norton
*Assistant Examiner*—Lynette T. Umez-Eronini

(57) ABSTRACT

The present invention relates chemical mechanical planarization ("CMP") of copper surfaces and describes copper CMP slurries including an oxidizer, one or more hydroxylamine compounds and at least one abrasive. The hydroxylamine compositions can include hydroxylamine nitrate, hydroxylamine, hydroxylamine sulfate, hydroxyl ammonium salts and mixtures thereof. The oxidizers may further include citric acid as a complexing agent for copper. Sulfuric acid and/or nitric acid provide means for modifying the pH of the oxidizer so that the hydroxylamine chemistries are acidic. Some embodiments include corrosion inhibitors such as benzotriazole, 2,4-pentadione dioxime and/or 1,6-dioxaspiro[4,4] nonane 2,7-dione. Some embodiments also include a free radical inhibitor, advantageously hydrazine. Colloidal silica and milled alumina are used as typical abrasive components.

45 Claims, 1 Drawing Sheet

U.S. PATENT DOCUMENTS

| | | |
|---|---|---|
| 5,863,307 A | 1/1999 | Zhou et al. .................... 51/307 |
| 5,897,375 A | 4/1999 | Watts et al. ................ 438/693 |
| 5,899,740 A | 5/1999 | Kwon ........................ 438/627 |
| 5,954,997 A | 9/1999 | Kaufman et al. ........... 405/199 |
| 5,981,454 A | 11/1999 | Small ......................... 510/175 |
| 6,063,306 A | 5/2000 | Kaufman et al. .......... 252/79.4 |
| 6,117,783 A | 9/2000 | Small et al. ................ 438/693 |
| 6,140,239 A | 10/2000 | Avanzino et al. ............ 438/692 |
| 6,156,661 A | 12/2000 | Small ......................... 438/692 |
| 6,251,150 B1 * | 6/2001 | Small et al. ................... 51/307 |
| 6,313,039 B1 | 11/2001 | Small et al. ................ 438/693 |
| 6,347,978 B1 * | 2/2002 | Fang et al. .................... 451/28 |
| 6,447,693 B1 * | 9/2002 | Pryor ........................ 252/79.1 |

* cited by examiner

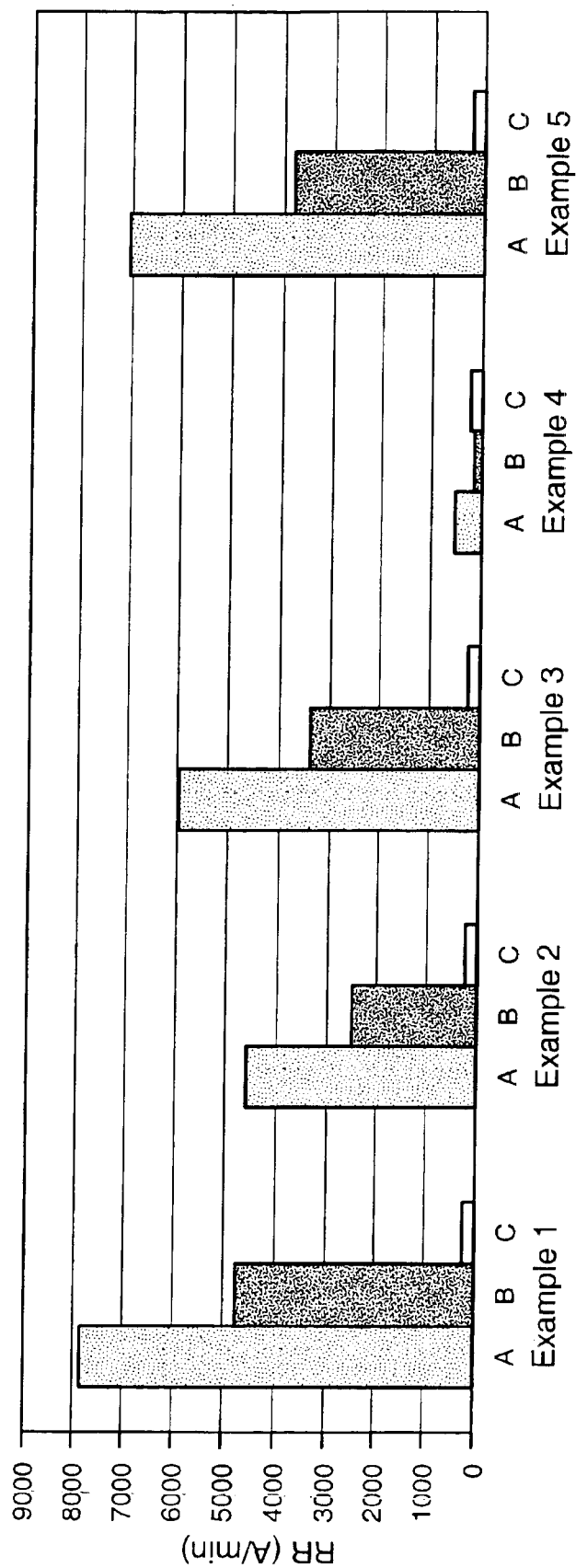
FIG._1

COMPOSITIONS FOR CHEMICAL MECHANICAL PLANARIZATION OF COPPER

BACKGROUND

1. Field of the Invention

The present invention relates generally to compositions for chemical mechanical planarization, particularly to compositions for chemical mechanical planarization of copper, tantalum and tantalum nitride layers as occur in the manufacture of integrated circuits.

2. Description of Related Art

Modern integrated circuits typically comprise millions of active devices on a single substrate, electrically interconnected through the use of single and multilevel interconnections including conductive lines and plugs ("vias"). Conventionally, integrated circuits include a semiconductor substrate and a plurality of sequentially formed dielectric layers and conductive patterns, including conductive lines, vias and interconnects. Typically, the conductive patterns on different layers, i.e. upper and lower layers, are electrically connected by a conductive interconnect or plug filling a via opening through the interlayer dielectric ("ILD"), while a conductive plug filling a contact opening establishes electrical contact with an active region on a semiconductor substrate, such as a source/drain region. As is known in the art, a damascene technique can be employed to form interconnects by forming an opening or channel in the ILD and filling the opening with a conductive material, typically a metal. The metal typically fills the channel in the ILD and covers the field region atop the ILD between channels. Planarization typically is the next step, removing the metal in the field region, removing barrier/adhesion layers (if any), and providing a substantially planar surface for further coating and patterning.

A dual damascene technique is also known in the art and can be employed to form conductive plugs and lines simultaneously. Basically, dual damascene involves forming an opening comprising a lower contact or via opening section in communication with an upper channel section, and filling the opening and channel section with a conductive material, typically a metal, to simultaneously form an electrically connected conductive plug and channel combination. Planarization follows, to remove metal and other materials as in the damascene technique.

Elemental aluminum and its alloys have been traditionally employed for filling metallic channels and vias in the fabrication of integrated circuits having relatively low integration density. The advantages of aluminum include its low resistivity, superior adhesion to typical dielectric layers (e.g. $SiO_2$), ease of patterning, and high purity.

However, aluminum and aluminum alloys are susceptible to detrimental increases in contact resistances during high temperature processing. Another problem associated with the use of aluminum and aluminum alloys in integrated circuits is electromigration, which becomes a more serious concern as the level of integration and the density of components increase. The higher number of circuit components in very large-scale integration ("VLSI"), ultra large-scale integration ("ULSI"), and even higher densities, requires the use of conductive interconnects with smaller cross sections. This causes higher electrical resistance in the interconnect and increased heat generation. Accordingly, as integrated circuit patterning schemes continue to miniaturize to submicron dimensions, aluminum based metallurgies have become increasingly marginal for handling the increased circuit speed and current density requirements. Materials having higher conductivity than aluminum or its alloys would be advantageous for use as interconnects. Hence, the escalating requirements for high density and performance associated with VLSI, ULSI and beyond require responsive changes in multilevel interconnection technology.

Currently, copper and copper alloys are receiving considerable attention as replacement materials for, inter alia, aluminum and aluminum alloys in VLSI and ULSI multilevel metallization systems. Copper has a lower resistivity than aluminum, and also significantly higher resistance to electromigration. However, problems with integrating copper metal into multilevel metallization systems include the difficulty of etching copper and its relatively high diffusivity. Since copper is difficult to pattern precisely and economically, damascene or dual damascene processing is typically preferred over subtractive patterning processes for creating copper interconnections. To hinder copper diffusion and to enhance its adhesion, barrier/adhesion layers (typically Ta/TaN) are used to separate the copper interconnections from the surrounding dielectric and to enhance the adhesion of the copper. However, these multicomponent layered structures of Cu/Ta/TaN/ILD exacerbate the problems of providing smooth surfaces for accurate patterning, while accurate patterning is increasingly necessary for providing reliable electrical contact to submicron features.

Chemical Mechanical Planarization (also referred to as Chemical Mechanical Polishing), or CMP, is the process of removing material and forming a substantially planar layer before additional layers are deposited and/or additional patterning occurs. CMP of copper and copper alloys deposited on a tantalum (Ta) and/or tantalum nitride (TaN) barrier/adhesion layer has become the subject of considerable interest. For economy of language, we refer to copper and/or copper alloys as "copper" and barrier/adhesion layer(s) as "barrier layer," understanding thereby that the copper conductor may include copper alloys (among other materials) and the barrier layer may have adhesive as well as barrier functions.

Slurries previously employed in the CMP processes of copper and/or barrier layers have suffered from several disadvantages, including an inadequate selectivity between removal rates of copper and barrier material. The selectivity in the removal of copper and barrier materials should be neither too high nor too low. Uncontrollable removal rates can be the undesirable result. Over-polishing of some materials in order to remove other materials may also occur when selectivity is too high. Over-polishing can lead to significant degradation, dishing or erosion of the surface being over-polished and consequently poor planarization.

Furthermore, current polishing slurries employed in these CMP processes have suffered from poor within-wafer-nonconformity values. Within-wafer-nonuniformity is a known way to quantify the uniformity of material removal rate on many points over a wafer. For example, pre-CMP thickness measurements are typically taken by measuring forty-nine points on each wafer and then post-CMP thickness measurements are taken at the same points. Within-wafer-nonuniformity is then calculated from the following formula:

$$\text{Within-wafer-nonuniformity ("WIWNU") \%} = 100[\sigma(\Delta_i)/\text{ave}(\Delta_i)] \qquad \text{Eq. 1.}$$

where $\Delta_i$=thickness of the material removed from point i on the wafer;

σ($\Delta_i$)=standard deviation of all $\Delta_i$ values on the wafer; and
ave($\Delta_i$)=mean of all $\Delta_i$ values on the wafer.

The set of $\Delta_i$'s are equal to the thickness removed or the pre-CMP thickness minus the post-CMP thickness for each of the measured points, i. Typically, good within-wafer-nonuniformity values are less than about 5%.

For the foregoing reasons, among others, there is a need for CMP slurry compositions that, inter alia, planarize or polish copper and/or Ta and/or TaN barrier layers at desirable high polishing rates while minimizing surface imperfections, defects, corrosion, dishing and erosion. Particularly, there is a need for one or more CMP slurry compositions that provide good selectivity between copper and barrier removal rates while providing good within-wafer-nonuniformity values. Additionally, there is a need for one or more CMP slurry compositions that provide a high copper removal rate and a low Ta and/or TaN barrier removal rate while avoiding significant degradation, dishing or erosion. Thus, ideally, there is a need for, inter alia, a "phase-one" or a first chemical mechanical planarization or polishing slurry for use in connection with copper damascene or dual damascene processes that removes the copper from the field region between the copper-containing interconnects and stops planarizing when the barrier layer is reached. We refer to wafers having copper deposited thereon as in a damascene or dual damascene process as "copper wafers," understanding that excess field region copper is to be removed by the CMP process. Following removal of the field region copper and exposure of the barrier layer in the phase-one CMP process, the barrier layer is then removed to complete the planarization. Different processing conditions and/or different CMP compositions are typically employed for the removal of the barrier layer.

We consider two general classes of CMP processes for the polishing of copper wafers. The first process employs a copper single-step slurry process involving a single chemical composition of the CMP slurry throughout the planarization that removes both the copper and barrier materials. This first CMP process is typically continuous, but polishing steps can be divided into as many sub-steps as needed by varying polishing pressure, speeds and other processing parameters. In general, a CMP processing step employing high polishing pressure can remove copper topography and planarize the surface efficiently with good removal uniformity. Subsequently, a step is employed using lower polishing pressure to remove the remaining copper substantially uniformly and continuing to remove barrier layer (tantalum/tantalum nitride or tungsten (W), among others) with a lower removal rate.

The second general class of CMP processes involves a phase-one and phase-two copper CMP process comprised of two separate polishing steps using two separate polishing slurry compositions. Phase-one slurry (or the first CMP step), typically containing oxidizer and abrasive, is designed to planarize copper topography quickly and then continue to remove the copper metal while maintaining good uniformity to the barrier layer. In the phase-two step, a slurry with an oxidizer is typically used to remove the barrier layer (TaN and/or Ta).

The present invention is directed to a phase-one or a first chemical mechanical planarization or polishing slurry that is able to selectively polish the copper portion of a copper wafer having a tantalum and/or tantalum nitride layer. Embodiments of the present invention include CMP compositions that polish both copper and barrier layers (under different polishing conditions) as well as compositions that polish only copper.

SUMMARY

The present invention relates generally to compositions for chemical mechanical planarization ("CMP") of copper surfaces and particularly to the CMP of multicomponent layered structures including Cu, typically overlying Ta/TaN barrier/adhesion layers on a dielectric material. Previously CMP slurries suffered from several disadvantages, including inadequate selectivity between copper and barrier layer removal, poor within-wafer-nonuniformity, degradation, dishing or erosion of the surface. The present invention relates to a "phase-one" CMP slurry that removes copper from the field region between the copper-containing interconnects and stops planarizing when the barrier layer is reached. In some embodiments of the present invention, the CMP slurry includes an oxidizer, one or more hydroxylamine compounds and at least one abrasive.

The hydroxylamine compositions include, in some embodiments of the present invention, the mild oxidizing agent hydroxylamine nitrate that includes a nitrate anion providing good removal rate controllability of the tantalum and/or tantalum nitride barrier underlying the copper. Other embodiments include hydroxylamine, hydroxylamine sulfate, hydroxyl ammonium salts and mixtures thereof.

Additionally, pursuant to some embodiments of the present invention, the oxidizers may further include citric acid as a complexing agent for copper. Sulfuric acid and/or nitric acid provide means for modifying the pH of the oxidizer so that the hydroxylamine chemistries are on the acidic side and are therefore oxidizers. Other acids that can be used include acetic acid, and/or perchloric acid.

Some embodiments of the present invention include corrosion inhibitors such as benzotriazole, 2,4-pentadione dioxime (which may also be referred to as 2,4-pentanedione dioxime), and/or 1,6-dioxaspiro [4,4] nonane 2,7-dione. Some embodiments of the present invention also include a free radical inhibitor, advantageously hydrazine or one or more hydrazine salts (for example, nitrate, sulfate, chloride, among others). Colloidal silica and milled alumina are used as abrasive components pursuant to some embodiments of the present invention.

DESCRIPTION OF THE DRAWINGS

FIG. 1: Graphical depiction of etching rates or removal rates for various processes described herein

DETAILED DESCRIPTION

The present invention ameliorates or overcomes one or more of the shortcomings of the prior art by providing CMP slurry compositions that have one or more of the following characteristics: 1) an improved copper/barrier selectivity; 2) an ability to planarize the copper portion of a copper and tantalum and/or a tantalum nitride layer at desired high planarization rates while reducing copper dishing and erosion; and 3) good within-wafer-nonuniformity values.

In some embodiments, the present invention provides a phase-one or first chemical mechanical planarization slurry that is able to selectively planarize the copper portion of a copper and tantalum and/or tantalum nitride layer. In some embodiments of the present invention, the phase-one or first chemical mechanical planarization slurry includes an oxidizer, one or more hydroxylamine compounds and at least one abrasive. The chemical mechanical planarization slurry or composition may comprise sufficient acid such that the pH of the composition is in a range from approximately 2.0 to approximately 5.0.

One of the hydroxylamine compositions pursuant to some embodiments of the present invention is hydroxylamine nitrate ($NH_2OH \cdot HNO_3$, "HAN"). HAN serves as a mild oxidizing agent, having a pH of about 3 to about 3.5 and includes a nitrate anion that provides good removal rate controllability of the tantalum and/or tantalum nitride barrier underlying the copper. Hence, one advantage of hydroxylamine nitrate over the known prior art is that it has better removal rate controllability as compared with hydrogen peroxide. The chemical activity of HAN can be shifted by changing the pH without seriously compromising the stability, which is an advantage over many other oxidizers ($H_2O_2$, ammonium persulfate, among others).

Another hydroxylamine composition pursuant to some embodiments of the present invention is hydroxylamine ($NH_2OH$). Hydroxylamine can be employed as an oxidizing agent and its pH may be adjusted from about 9 to a value in the acidic range (<7) by adding various types of acids such as nitric or sulfuric acid.

A further hydroxylamine composition pursuant to some embodiments of the present invention is hydroxylamine sulfate [$(NH_2OH)_2 \cdot H_2SO_4$, "HAS"]. Pursuant to some embodiments of the present invention, hydroxylamine sulfate is employed to control the rate at which the barrier layer is exposed and polished through. Thus, some embodiments of the present invention strike a balance between HAN and HAS to obtain peak performance, i.e., to obtain an advantageous barrier removal rate. Thus, pursuant to some embodiments of the present invention, HAS provides one technique for introducing an additional oxidizing agent into the slurry while controlling the concentration or availability of the anions, whether nitrate or sulfate.

A surprising phenomenon was discovered in connection with the use of the hydroxylamine compounds as a component for copper planarization. Normally, copper film in the presence of a solution having a very low pH is easily dissolved off of the surface as long as an oxidizer is supplied to the dissolving film such that removal occurs more by means of a chemical effect rather than a mechanical polishing effect. In contrast, and surprisingly, hydroxylamine-based chemistries do not seem to exhibit the same phenomenon. A low pH does not demonstrate a high copper removal rate and, as the pH increases (but remains acidic) the copper removal rate increases. This is counter intuitive because, as the pH increases and approaches a pH of 5 or 6, the copper oxides (copper I and copper II) become harder. Thus, one would predict that these harder oxides of copper would be more protective against etch. However, chemical etching by hydroxylamines is seen to increase with increasing pH despite the presence of such oxides.

Additionally, pursuant to some embodiments of the present invention, the oxidizers can further include citric acid and/or sulfuric acid. Citric acid functions as a complexing agent for copper, helping to retain copper in the form of a complex so as to preclude copper from redepositing on the wafer surface or from coming out of solution because of other secondary chemical reactions. Sulfuric acid and/or nitric acid provide means for modifying the pH of the oxidizer so that the hydroxylamine chemistries are on the acidic side and are therefore oxidizers. Other acids that can be used include acetic acid, and/or perchloric acid.

Furthermore, and pursuant to some embodiments of the present invention, the oxidizers can include benzotriazole ($C_6H_4NHN_2$, "BTA"). Benzotriazole is typically employed as a corrosion inhibitor for controlling the chemical etching of copper. Moreover, and pursuant to some embodiments of the present invention, the benzotriazole can be replaced with 2,4-pentadione dioxime and/or 1,6-dioxaspiro[4,4] nonane 2,7-dione wholly or in part.

The oxidizers, according to some embodiments of the present invention, can also include a free radical inhibitor (or quencher), advantageously hydrazine or derivatives thereof. Examples of free radical inhibitors include hydrazine and hydrazine salts (for example, nitrate, sulfate, chloride, among others). Some oxidation reactions that occur during CMP may take a pathway generating free radical reaction products which tends to be disadvantageous to the CMP process because free radicals can reduce the concentration of the necessary active CMP polishing reagents and possibly form undesirable by-products. Thus, free radical inhibitors are advantageously included in some embodiments of the present invention to avoid such drawbacks.

CMP slurry compositions for copper are delineated in detail in the following examples. In all such examples, numerical values for concentrations, amounts, pH and the like are approximate unless specifically stated to be precise.

Copper Phase-One CMP Slurry Compositions

In some embodiments, the present invention includes an oxidizer and an abrasive composition.

Oxidizers

Oxidizer Components ("Oxidizer A")

One oxidizer ("Oxidizer A") pursuant to some embodiments of the present invention includes hydroxylamine and hydroxylamine nitrate in aqueous solution (advantageously in distilled or de-ionized water, referred to collectively herein as "DI" water) in sufficient concentrations to perform CMP. Typical concentration ranges for the components are as follows: approximately 0.3% to approximately 10% by weight hydroxylamine, and approximately 0.1% to approximately 3% by weight hydroxylamine nitrate, in aqueous solution. For economy of expression we describe the above approximate concentration ranges symbolically as: hydroxylamine (~0.3%–~10%), hydroxylamine nitrate (~0.1%–~3%). One example of component concentrations for Oxidizer A is given in Table $A_x$.

TABLE $A_x$

Typical composition for Oxidizer A:

| Component | Component Concentration (Approximate Weight Percents) |
|---|---|
| Hydroxylamine | 3.5% |
| Hydroxylamine Nitrate | 2.5% |
| DI water | 94% | pH Range

Oxidizer A is advantageously adjusted to have a pH range from about 6.6 to about 6.8 by the addition of an appropriate amount of acid as described above.

Oxidizer Components ("Oxidizer B")

Another oxidizer ("Oxidizer B") pursuant to some embodiments of the present invention includes hydroxylamine, hydroxylamine nitrate, hydroxylamine sulfate, and DI water in sufficient concentrations to perform CMP. Typical concentration ranges are as follows: Hydroxylamine (~0.3%–~10%), hydroxylamine nitrate (~0.1%–~3%), hydroxylamine sulfate (~0.001%–~12%). One example of approximate component concentrations for Oxidizer B is shown in Table $B_x$.

TABLE B$_x$

Typical composition for Oxidizer B:

| Component | Component Concentration (Approximate Weight Percent) |
|---|---|
| Hydroxylamine | 3.5% |
| Hydroxylamine Nitrate | 0.82% |
| Hydroxylamine Sulfate | 3.0% |
| DI water | 92.68% | pH Range

Oxidizer B is advantageously adjusted to have a pH range from about 6.7 to about 6.8 by the addition of an appropriate amount of acid as described above.

It is advantageous in some embodiments of the present invention to include in the oxidizer formulations various additives ("agents") that form copper complexes. In particular, some embodiments include copper complexing agents that result in water-soluble copper complexes, tending to facilitate thereby the CMP of copper. Chelating agents, such as citric acid, are one class of copper complexing agents forming soluble complexes. For economy of language, we denote by "Soluble Complexing Agents" those chemical species that form complexes with copper wherein such complexes are soluble in aqueous solution. In practice, the use of such Soluble Complexing Agents does not lead to the formation of precipitates or films of copper complex. Citric acid is one example of a Soluble Complexing Agent. Other examples include, but are not limited to, copper-complexing catechol derivatives, copper-complexing alpha hydroxy organic acids (for example, lactic acid among others typically having molecular weights less than about 150), copper-complexing hydroxamic acids, copper-complexing amino acids (typically having molecular weights less than about 150), copper-complexing dicarboxylic acids that can typically form rings that include copper ion(s) such that the rings are typically 5-, 6-, or 7-member rings and have molecular weights typically less than about 175.

Soluble Complexing Agents should be contrasted with "Insoluble Complexing Agents" that lead to insoluble complexes of copper, typically deposited as a film on the surface undergoing planarization. Examples of Insoluble Complexing Agents include benzotriazole ("BTA"), 1,6-dioxaspirol [4,4] nonane 2,7-dione ("DND") and various dioximes as depicted in Structure 1.

Structure 1.

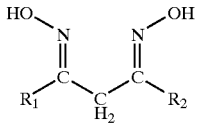

In Structure 1, dioximes R$_1$, R$_2$=H, C$_1$–C$_4$ aliphatic hydrocarbons. When R$_1$=R$_2$=CH$_3$, Structure 1 is 2,4 pentadione dioxime. 2,4 pentadione dioxime ("PDO") is advantageously used in some embodiments of the present invention, although other dioximes as depicted in Structure are included as well.

In further embodiments of the present invention, Insoluble Complexing Agents, typically BTA, PDO, DND or mixtures thereof, are used to block the surface of copper from corroding or dissolving away in the absence of an oxidizer, or corroding or dissolving away at a controlled rate in the presence of an oxidizer.

BTA typically forms a monolayer in the form of a cover salt, i.e., a copper reaction product. The cover salt is substantially insoluble and thus, makes the copper basically insoluble at its surface. The cover salt can be removed under extreme chemical conditions that include the use of strong acids or bases. The cover salt can also be physically removed by the mechanically abrasive component of the CMP process. However, the cover salt reforms and blocks the removal of copper from the surface in the absence of the CMP process. Thus, the presence of BTA and other Insoluble Complexing Agents from blocking compounds and hinder the copper corrosion or dissolution from the surface.

However, BTA has the disadvantage that it stack-crystallizes further BTA on top of the protective monolayer on the copper surface. The presence of these additional crystalline layers can too strongly prevent copper removal. Furthermore, these crystalline layers typically contain BTA crystals having sharp edges which, during mechanical abrasion of normal CMP processing, may physically scratch the wafer.

2,4-Pentadione dioxime also forms a protective copper reaction product with the copper film but only a monolayer is formed. Thus blocking is provided that is similar to that provided by BTA but without the dangers associated with the stacked crystal formation characteristic of BTA. That is, both form insoluble products at about the same rate and having about the same degree of insolubility. However, PDO can form insoluble products at pH levels as low as pH=2 to 3. Thus, PDO forms complexes with copper without the occurrence of stack crystallizing further layers on the initial monolayer.

In accordance with some embodiments of the present invention, the CMP polishing slurry can include one or more Insoluble Complexing Agents such as PDO.

Oxidizer Components ("Oxidizer C")

Another oxidizer ("Oxidizer C") according to some embodiments of the present invention includes hydroxylamine, hydroxylamine sulfate, a Soluble Complexing Agent, sulfuric acid, DI water, and benzotriazole. One example of approximate component concentrations for Oxidizer C is shown in Table C$_x$.

TABLE C$_x$

Typical composition for Oxidizer C:

| Component | Component Concentration (Approximate Weight Percent) |
|---|---|
| Hydroxylamine | 2.0% |
| Hydroxylamine Sulfate (solid) | 3.0% |
| Citric acid (solid) | 0.2% |
| Sulfuric acid H$_2$SO$_4$ (@ 95–98% acid) | 2.7–2.8% |
| DI water | Sufficient to make 100% |
| Benzotriazole | 0.025% | pH Range

Oxidizer C is advantageously adjusted to have a pH range from about 2.9 to about 3.1 by the addition of an appropriate amount of acid as described above.

Oxidizer Components ("Oxidizer D")

Another oxidizer ("Oxidizer D") according to some embodiments of the present invention includes DI water containing dissolved therein hydroxylamine and ammonium salts, including but not limited to nitrate, sulfate, phosphate and chloride. Nitrate and sulfate are more advantageous due to favorable solubility and corrosion properties (either as solids or as solutions). One example of approximate component concentrations for Oxidizer D is shown in Table D$_x$.

TABLE D$_x$

Typical composition for Oxidizer D:

| Component | Component Concentration (Approximate Weight Percent) |
|---|---|
| Hydroxylamine | 2.0% |
| Ammonium salt | 3.0% |
| DI Water | Sufficient to make 100% | pH Range

Oxidizer D is advantageously adjusted to have a pH range from about 2.7 to about 3.3 by the addition of an appropriate amount of acid as described above.

Oxidizer Components ("Oxidizer E")

Another oxidizer ("Oxidizer E") according to some embodiments of the present invention includes hydroxylamine, hydroxylamine sulfate, sulfuric acid, and DI water. One example of approximate component concentrations for Oxidizer E is shown in Table E$_x$.

TABLE E$_x$

Typical composition for Oxidizer E

| Component | Component Concentration (Approximate Weight Percent) |
|---|---|
| Hydroxylamine | 2.0% |
| Hydroxylamine Sulfate (solid) | 3.0% |
| Sulfuric acid $H_2SO_4$ (@ 95–98% acid) | 2.7% |
| DI water | Sufficient to make 100% | pH Range

Oxidizer E is advantageously adjusted to have a pH range from about 3 to about 3.2 by the addition of an appropriate amount of acid as described above.

Oxidizer Components ("Oxidizer F")

Another oxidizer ("Oxidizer F") according to some embodiments of the present invention comprises hydroxylamine, hydroxylamine sulfate, sulfuric acid, and DI water. One example of approximate component concentrations for Oxidizer F is shown in Table F$_x$.

TABLE F$_x$

Typical composition for Oxidizer F:

| Component | Component Concentration (Approximate Weight Percent) |
|---|---|
| Hydroxylamine | 2.0% |
| Hydroxylamine Sulfate (solid) | 3.0% |
| Sulfuric acid $H_2SO_4$ (@ 95–98% acid) | 2.7% |
| Citric acid (solid) | 0.2% |
| DI water | Sufficient to make 100% | pH Range

Oxidizer F is advantageously adjusted to have a pH range from about 3 to about 3.2 by the addition of an appropriate amount of acid as described above.

Oxidizer Components ("Oxidizer G")

Another oxidizer ("Oxidizer G") according to some embodiments of the present invention includes hydroxylamine sulfate, hydroxylamine, sulfuric acid, hydrazine ($NH_2NH_2$), 4-hydrazine benzoic acid (solid), and DI water. One example of approximate component concentrations for Oxidizer G is shown in Table G$_x$. Good results have been obtained with this particular example containing hydroxylamine.

TABLE G$_x$

Typical composition for Oxidizer G:

| Component | Component Concentration (Approximate Weight Percent) |
|---|---|
| Hydroxylamine Sulfate (solid) (HAS) | 3.0% |
| Hydroxylamine (HDA) | 2.4% |
| Sulfuric acid $H_2SO_4$ (@ 95–98% acid) | 4.2% |
| Hydrazine (99%) ($NH_2NH_2$) | 0.2% |
| 4-hydrazine benzoic acid (solid) (HBA) | 0.03% | pH Range

Oxidizer G is advantageously adjusted to have a pH range from about 3.0 to about 3.4 by the addition of an appropriate amount of acid as described above.

Oxidizers Comprising a Free Radical Inhibitor

As mentioned above, the oxidizers in accordance with the present invention may further include a free radical inhibitor including hydrazine and hydrazine salts (for example, nitrate, sulfate, chloride, among others) whose function is to inhibit free radical formation during the polishing process.

Abrasives

Abrasive Components ("Abrasive A")

One abrasive ("Abrasive A") according to some embodiments of the present invention comprises colloidal silica. An example of Abrasive A is shown in the Table A$_a$.

TABLE A$_a$

Typical Composition for Abrasive A

| Type | Colloidal silica |
|---|---|
| Concentration (Weight % in DI water) | 33.5–25% |
| Particle Size (range) | 20–150 nanometers |
| Particle Size (average) | 71–73 nanometers |
| Commercial Source | Dupont: DP106 |

In one embodiment, Abrasive A can be of the type which is manufactured by Dupont, sold under the name DP 106, and further processed (milled and filtered) by EKC Technology, Inc. and sold thereby under the name MicroPlanar™ CMP9000™. A Material Safety Data Sheet for this product is attached hereto (Attachment A) and incorporated herein in its entirety by this reference. The colloidal silica, in this example, has a particle size having a range between about 20 and 150 nanometers and includes an average particle size having a range between about 71 to 73 nanometers.

pH Ranges

The normal pH range of the composition presented is from about 7.4 to about 8.5.

Abrasive Components ("Abrasive B")

Another abrasive composition ("Abrasive B") according to some embodiments of the present invention comprises milled alumina. One example of Abrasive B is shown in Table B$_a$.

TABLE B$_a$

Typical Composition for Abrasive B

| Type | Milled Alumina |
|---|---|
| Concentration Weight | 20% |
| Particle Size (range) | 20–250 nanometers |
| Particle Size (average) | 90 nanometers |
| Source | Baikowski: CR-85 |

In one embodiment, the milled alumina can be of the type that is manufactured by Baikowski Chimie Co. of Annecy Cedex 9, France, sold under the name, CR-85. This product is processed further by EKC Technology, Inc. and sold thereby under the name, MicroPlanar™ CMP9001™. A Material Safety Data Sheet for this product is attached hereto (Attachment B) and incorporated herein in its entirety by this reference.

pH Ranges

The processed alumina has a general pH range from about 3.5 to about 5 and, advantageously, the pH is adjusted to lie in the range from about 4 to about 4.5. Adjustment of pH is typically performed by means of nitric acid optionally including aluminum nitrate.

Copper CMP Slurry Compositions

Copper CMP Slurry Composition ("Slurry 1 Composition")

Some embodiments of the present invention comprise Oxidizer A and Abrasive A mixed to form a Slurry 1 Composition. In one example, and according to some embodiments of the present invention, the mixing ratio, process and removal rate data for the Slurry 1 Composition is shown in the Table 1.

TABLE 1

Slurry 1 Composition: Mixing Ratio, Process and Removal Rate

| | | Removal Rate (A/min) | | | |
|---|---|---|---|---|---|
| Mixing Ratio | Process | Cu | WIWNU % | TaN | WIWNU % |
| 10% of Abrasive A 90% of Oxidizer A | 5/0/60/61 | 7202 | 6.2% | 648 | 14.7% |

In Table 1, the Slurry 1 Composition is comprised of 10% of Abrasive A and 90% of Oxidizer A. The process delineated with respect to the Slurry 1 Composition is achieved by applying 5 psi down force pressure, 0 psi back pressure, 60 rpm table speed (22.5 inch diameter) and 61 rpm carrier speed (8 inch diameter). The Slurry 1 Composition, when employed according to the above process, provides a Cu:TaN selectivity of approximately 11.1 (removal rate of Cu divided by the removal rate of TaN) and a copper within-wafer-nonuniformity (WIWNU %) of approximately 6.2%.

Cu Slurry Composition ("Slurry 2 Composition")

Other embodiments of the present invention include Oxidizer B and Abrasive A mixed to form a Slurry 2 Composition. In one example, and according to some embodiments of the present invention, the mixing ratio, process and removal rate data for the Slurry 2 Composition is shown in Table 2.

TABLE 2

Slurry 2 Composition: Mixing Ratio, Process and Removal Rate

| | | Removal Rate (A/min) | | | |
|---|---|---|---|---|---|
| Mixing Ratio | Process | Cu | WIWNU % | TaN | WIWNU % |
| 10% of Abrasive A 90% of Oxidizer B | 5/0/60/61 | 7113 | 5% | 515 | 16% |

In Table 2, the Slurry 2 Composition is comprised of 10% of Abrasive A and 90% of Oxidizer B. The process delineated with respect to the Slurry 2 Composition is achieved by applying 5 psi down force pressure, 0 psi back pressure, 60 rpm table speed (22.5 inch diameter) and 61 rpm carrier speed (8 inch diameter). The Slurry 2 Composition, when employed according to the above process, provides a Cu:TaN selectivity of approximately 13.8 and a copper within-wafer-nonuniformity (WIWNU %) of approximately 5%.

Cu Slurry Composition ("Slurry 3 Composition")

Other embodiments of the present invention include Oxidizer C and Abrasive B mixed to form a Slurry 3 Composition. In one example, and according to some embodiments of the present invention, the mixing ratio, process and removal rate data for the Slurry 3 Composition is shown in Table 3.

TABLE 3

Slurry 3 Composition: Mixing Ratio, Process and Removal Rate

| | | Removal Rate (A/min) | | | |
|---|---|---|---|---|---|
| Mixing Ratio | Process | Cu | WIWNU % | TaN | WIWNU % |
| Process 3(A) | | | | | |
| 40% of Abrasive B 60% of Oxidizer C | 5/0/90/90 | 6904 | 8.2% | N/A | N/A |
| Process 3(B) | | | | | |
| 40% of Abrasive B 60% of Oxidizer C | 3/0/75/75 | 3123 | 14.6% | 240 | 16.7% |

Process 3(A) above is performed by applying 5 psi down force pressure, 0 psi back pressure, 90 rpm table speed (22.5 inch diameter) and 90 rpm carrier speed (8 inch diameter). The slurry 3 composition, when employed according to the above first process, provides a copper within-wafer-nonuniformity (WIWNU %) of approximately 8.2%.

Process 3(B) above is performed by applying 3 psi down force pressure, 0 psi back pressure, 75 rpm table speed (22.5 inch diameter) and 75 rpm carrier speed (8 inch diameter). The Slurry 3 Composition, when employed according to the above second process, provides a Cu:TaN selectivity of approximately 13.0 and a copper within-wafer-nonuniformity (WIWNU %) of 14.6%.

Cu Slurry Composition ("Slurry 4 Composition")

Other embodiments of the present invention include Oxidizer C, Abrasive B, diluted with DI water and mixed to form a Slurry 4 Composition. In one example, and according to some embodiments of the present invention, the mixing ratio, process and removal rate data for the Slurry 4 Composition is shown in Table 4.

TABLE 4

Slurry 4 Composition: Mixing Ratio, Process and Removal Rate

| | | Removal Rate (A/min) | | | |
|---|---|---|---|---|---|
| Mixing Ratio | Process | Cu | WIWNU % | TaN | WIWNU % |
| Process 4(A) | | | | | |
| 25% of Abrasive B, 50% of Oxidizer C and 25% DI water | 5/0/90/90 | 6539 | 5.5% | N/A | N/A |
| Process 4(B) | | | | | |
| 25% of Abrasive B, 50% of Oxidizer C and 25% DI water | 2/0/70/90 | 2243 | 8.6% | 171 | 14.3% |

Process 4(A) above is performed by applying 5 psi down force pressure, 0 psi back pressure, 90 rpm table speed (22.5 in diameter) and 90 rpm carrier speed (8 in diameter). The Slurry 4 Composition, when employed according to Process 4(A), provides a copper within-wafer-nonuniformity (WIWNU %) of 5.47%.

Process 4(B) above is performed by applying 2 psi down force pressure, 0 psi back pressure, 70 rpm table speed (22.5 in diameter) and 90 rpm carrier speed (8 in diameter). The Slurry 4 Composition, when employed according to Process 4(B), provides a Cu:TaN selectivity of approximately 13.1 and a copper within-wafer-nonuniformity (WIWNU %) of 8.6%.

Copper Slurry Composition ("Slurry 5 Composition")

Some embodiments of the present invention include an oxidizer ("Oxidizer D"), an Insoluble Complexing Agent (such as 2,4-pentadione dioxime), $H_2SO_4$, an abrasive and DI Water mixed to form the Slurry 5 Composition.

Concentrations for one example of Slurry 5 Composition are shown in Table 5. The concentration of, inter alia, the Insoluble Complexing Agent of the present invention may be changed to alter the resultant slurry. For example, a concentration of 2,4 pentadione dioxime from about 0.05% to about 0.1% by weight was used in the CMP process.

pH Range

The slurry composition has a pH range of about 2.5 to about 3.2.

CMP Processing and Results for Slurry 5 Composition

Composition, concentrations and the CMP process parameters can be altered to produce different CMP results. Typically, the CMP process includes covering the surface of the wafer with the slurry and polishing the wafer. Thus, the CMP process is effected by polish time in seconds ("s"), polish pressure (or polish down force (PSI)) ("pp"), polish table speed, RPM ("ts"), spindle speed (carrier speed), RPM ("ss") and slurry flow in ml/min ("sf"). The CMP results of the process include the mean copper removal rate (MRR) in angstroms per min and the within wafer within-wafer-nonuniformity (%) (WIWNU).

The result under the column heading "Dia-58 pt" represents 58 points diameter measurement across the whole wafer by DCE Resmap four point probe. The result under the column "Polar-49 pt/6 mmEE" represents 49 points polar measurement with 6 mm edge exclusion by Resmap.

The CMP process and results for a first example employing the Slurry 5 Composition are shown in the following table.

Process 5(A)
CMP Process and Results Utilizing the Slurry 5 Composition (Example 1)

| | | Dia - 58 pt | | Polar-49 pt/6 mmEE | |
|---|---|---|---|---|---|
| Slurry Composition | CMP Process s/pp/ts/ss/sf | Mean Removal Rate (Å/min) | Within Wafer Non Uniformity (%) | Mean Removal Rate (Å/min) | Within Wafer Non Uniformity (%) |
| Slurry 5 Composition | 60/5/90//90/175 | 7777 | 6.2% | 7870 | 4.8% |

TABLE 5

Slurry 5 Composition Concentrations

| Composition | Composition Concentration (Weight Percent) |
|---|---|
| Oxidizer D | 60.0% |
| 2,4-Pentadione Dioxime | 0.05% |
| $H_2SO_4$ | 1.9% |
| Abrasive B | 20.0% |
| DI Water | 18.05% |

Thus, the above Process 5(A) is used with the Slurry 5 Composition and is achieved by using a polish time of 60 seconds, with a polish pressure of 5psi, a polish table speed of 90 RPM, a spindle speed of 90 RPM and a slurry flow of 175 ml/min.

Process 5(B) below is used with the Slurry 5 Composition and is achieved by using a polish time of 60 seconds, with a polish pressure of 3 psi, a polish table speed of 75 RPM, a spindle speed of 75 RPM and a slurry flow of 175 ml/min.

The CMP process and results for the second example employing the Slurry 5 Composition are shown in the following table.

Process 5(B)
CMP Process and Results Utilizing the Slurry 5 Composition (Example 2)

| | | Dia - 58 pt | | Polar-49 pt/6 mmEE | |
|---|---|---|---|---|---|
| Slurry Composition | CMP Process s/pp/ts/ss/sf | Mean Removal Rate (Å/min) | Within Wafer Non Uniformity (%) | Mean Removal Rate (Å/min) | Within Wafer Non Uniformity (%) |
| Slurry 5 Composition | 60/3/75//75/175 | 3910 | 12.3% | 4325 | 10.4% |

Note that the Slurry 5 Composition is advantageous in that it provides a large range of WIWNU (4.8% to 10.4%) to account for process variations.

Copper Slurry Composition ("Slurry 6 Composition")

In other embodiments of the present invention, the weight of 2,4-pentadione dioxime is approximately doubled from Slurry 5 to form a Slurry 6 Composition.

Composition concentrations for one example of the Slurry 6 Composition are shown in Table 6. Good results have been obtained with this particular example containing 0.1% 2,4-pentadione dioxime. It should be noted that the concentration of, inter alia, the Insoluble Complexing Agent (2,4-pentadione dioxime) of the present invention may be changed to alter the resultant slurry. Concentrations of 2,4-pentadione dioxime from about 0.05% to about 0.10% by weight were used in the CMP processes.

Thus, the above Process 6(A) is used with the Slurry 6 Composition and is achieved by using a polish time of 60 seconds, with a polish pressure of 5 psi, a polish table speed of 90 RPM, a spindle speed of 90 RPM and a slurry flow of 175 ml/min.

A second process example is used with the Slurry 6 Composition and is achieved by using a polish time of 60 seconds, with a polish pressure of 3 psi, a polish table speed of 75 RPM, a spindle speed of 75 RPM and a slurry flow of 175 ml/min.

The CMP process and results for the second example employing the Slurry 6 Composition are shown in the following table.

Process 6(B)
CMP Process and Results Utilizing the Slurry 6 Composition (Example 2)

| | | Dia - 58 pt | | Polar-49 pt/6 mmEE | |
|---|---|---|---|---|---|
| Slurry Composition | CMP Process S/pp/ts/ss/sf | Removal Rate (Å/min) | Within Wafer Non Uniformity (%) | Removal Rate (Å/min) | Within Wafer Non Uniformity (%) |
| Slurry 6 Composition | 60/3/75//75/175 | 4434 | 7.2% | 4874 | 9.8% |

TABLE 6

Slurry 6 Composition Concentrations

| Composition | Composition Concentration (Approximate Weight Percent) |
|---|---|
| Oxidizer D | 60.0% |
| 2,4-Pentadione Dioxime | 0.1% |
| $H_2SO_4$ | 1.9% |
| Abrasive B | 20.0% |
| DI Water | 18% | pH Range

The slurry composition has a preferred pH range from about 2.5 to about 3.2.

The CMP process and results for a first example employing the Slurry 6 Composition are shown in the following table. This process may be altered using the same slurry to acquire different CMP Results.

Copper Slurry Composition ("Slurry 7 Composition")

Other embodiments of the present invention include Oxidizer D, 1,6-dioxaspiro[4,4] nonane 2,7-dione (a diester that is an insoluble Complexing Agent), $H_2SO_4$, an abrasive and DI water mixed to form the Slurry 7 Composition.

As noted above, Oxidizer D composition, according to some embodiments of the present invention, comprises 4% hydroxylamine, 3% hydroxyl ammonium salt and 93% DI water.

Composition concentrations, for one example, are shown in Table 7 and it should be noted that the concentration of, inter alia, the Insoluble Complexing Agent of the present invention may be changed to alter the resultant slurry. The concentration of Insoluble Complexing Agent 1,6-dioxaspirol[4,4] nonane 2.7-dione used for etching tests was from about 0.01% to about 0.2% by weight. As used for CMP, the concentration was from about 0.05% to about 0.1%.

Process 6(A)
CMP Process and Results Utilizing the Slurry 6 Composition (Example 1)

| | | Dia - 58 pt | | Polar-49 pt/6 mmEE | |
|---|---|---|---|---|---|
| Slurry Composition | CMP Process s/pp/ts/ss/sf | Removal Rate (Å/min) | Within Wafer Non Uniformity (%) | Removal Rate (Å/min) | Within Wafer Non Uniformity (%) |
| Slurry 6 Composition | 60/5/90//90/175 | 7878 | 5.2% | 8185 | 4.7% |

TABLE 7

Slurry 7 Composition Concentrations

| Compositions | Composition Concentrations (Approximate Weight Percent) |
|---|---|
| Oxidizer D | 60.0% |
| 1,6-Dioxaspiro[4.4] nonane 2,7-dione | 0.05% |
| Sulfuric Acid $H_2SO_4$ | 1.9% |
| Abrasive | 20.0 |
| DI Water | 18.05% | pH Range

The slurry composition has a pH range from about 2.7 to about 3.5.

The CMP process and results for a first example employing the Slurry 7 Composition are shown in the following table.

Process 7(A)
CMP Process and Results Utilizing the Slurry 7 Composition (Example 1)

| Slurry Composition | CMP Process s/pp/ts/ss/sf | Dia - 58 pt Removal Rate (Å/min) | Within Wafer Non Uniformity (%) | Polar-49 pt/6 mmEE Removal Rate (Å/min) | Within Wafer Non Uniformity (%) |
|---|---|---|---|---|---|
| Slurry 7 Composition | 60/5/90//90/175 | 6192 | 6.5% | 6171 | 4.1% |

Thus, the above process is used with the Slurry 7 Composition and is achieved by using a polish time of 60 seconds, with a polish pressure of 5 psi, a polish table speed of 90 RPM, a spindle speed of 90 RPM and a slurry flow of 175 ml/min.

A second process example is used with the Slurry 7 Composition and is achieved by using a polish time of 60 seconds, with a polish pressure of 3 psi, a polish table speed of 75 RPM, a spindle speed of 75 RPM and a slurry flow of 175 ml/min.

The CMP process and results for the second example employing the Slurry 7 Composition are shown in the following table.

Process 7(B)
CMP Process and Results Utilizing the Slurry 7 Composition (Example 2)

| Slurry Composition | CMP Process s/pp/ts/ss/sf | Dia - 58 pt Mean Removal Rate (Å/min) | Within Wafer Non Uniformity (%) | Polar-49 pt/6 mmEE Mean Removal Rate (Å/min) | Within Wafer Non Uniformity (%) |
|---|---|---|---|---|---|
| Slurry 7 Composition | 60/3/75//75/175 | 2822 | 4.5% | 2891 | 5.4% |

Copper Slurry Composition ("Slurry 8 Composition")

In other embodiments of the present invention, the weight percent of 1,6-Dioxaspiro[4.4] nonane 2,7-dione (an Insoluble Complexing Agent) is approximately doubled from that of Slurry 7.

Composition concentrations for one example of the Slurry 8 Composition are shown in the following table and is should be noted that the concentration of, inter alia, the Insoluble Complexing Agent of the present invention may be changed to alter the resultant slurry. The concentration of Insoluble Complexing Agent 1,6-Dioxaspirol [4,4] nonane 2,7-dione used for etching tests was from about 0.01% to about 0.2% by weight. As used for CMP, the concentration was from about 0.05% to about 0.1%

TABLE 8

Slurry 8 Composition Concentrations

| Composition | Composition D Concentration (Approximate Weight Percent) |
|---|---|
| Oxidizer D | 60.0% |
| 1,6-Dioxaspiro[4.4] nonane 2,7-dione | 0.10% |

TABLE 8-continued

Slurry 8 Composition Concentrations

| Composition | Composition D Concentration (Approximate Weight Percent) |
|---|---|
| Sulfuric Acid $H_2SO_4$ | 2.0% |
| Abrasive | 20.0 |
| DI Water | 18% | pH Range

The slurry composition has a preferred pH range from about 2.7 to about 3.7.

The CMP process and results for a first example employing the Slurry 8 Composition are shown in the following table. This process may be altered using the same slurry to acquire different CMP Results.

Process 8(A)
CMP Process and Results Utilizing the Slurry 8 Composition (Example 1)

| | | Dia - 58 pt | | Polar-49 pt/6 mmEE | |
|---|---|---|---|---|---|
| Slurry Composition | CMP Process s/pp/ts/ss/sf | Mean Removal Rate (Å/min) | Within Wafer Non Uniformity (%) | Mean Removal Rate (Å/min) | Within Wafer Non Uniformity (%) |
| Slurry 8 Composition | 60/5/90//90/175 | 4654 | 6.2% | 4545 | 5.2% |

Thus, the above process is used with the Slurry 8 Composition and is achieved by using a polish time of 60 seconds, with a polish pressure of 5 psi, a polish table speed of 90 RPM, a spindle speed of 90 RPM and a slurry flow of 175 ml/min.

A second process example is used with the Slurry 8 Composition and is achieved by using a polish time of 60 seconds, with a polish pressure of 3 psi, a polish table speed of 75 RPM, a spindle speed of 75 RPM and a slurry flow of 175 ml/min.

The CMP process and results for the second example employing the Slurry 8 Composition are shown in the following table.

Process 8(B)
CMP Process and Results Utilizing the Slurry 8 Composition (Example 2)

| | | Dia - 58 pt | | Polar-49 pt/6 mmEE | |
|---|---|---|---|---|---|
| Slurry Composition | CMP Process s/pp/ts/ss/sf | Removal Rate (Å/min) | Within Wafer Non Uniformity (%) | Removal Rate (Å/min) | Within Wafer Non Uniformity (%) |
| Slurry 8 Composition | 60/3/75//75/175 | 2308 | 5.2% | 2331 | 8.8% |

Oxidizers Comprising Citric and/or Sulfuric Acid

As mentioned above, the oxidizers in accordance with the present invention may further include sulfuric and/or citric acid.

Sulfuric acid provides a way of modifying the pH of the oxidizer to be acidic, resulting in the hydroxylamines being oxidizers.

Citric acid works as a complexing agent for copper for helping to retain copper in a complex form (i.e., in a copper I or copper II state) so as to preclude copper from redepositing or coming out of solution because of other secondary chemical reactions.

Copper CMP Slurry Compositions Comprising Oxidizer E

Some embodiments of the present invention include slurry compositions comprised of Oxidizer E and Abrasive B. The Table 9 delineates five specific examples of slurry compositions in accordance with some embodiments of the present invention and further delineates composition concentrations (mixing ratios), process and removal rate data for each of the five respective examples (Examples 1 through 5). In Table 9, "RR" is the "Removal Rate" in angstroms per minute. Good results have been obtained with Example 3.

TABLE 9

CMP Mixing Ratios, Processes and Results

| | Cu RR | | TaN RR |
|---|---|---|---|
| Slurry Composition Examples 1 through 5 | CMP Process (A) s/pp/ts/ss 5/2/90/90 | CMP Process (B) s/pp/ts/ss 3/2/75/75 | CMP Process (C) s/pp/ts/ss 3/2/75/75 |
| 1) 60% of Oxidizer E, 20% of Abrasive B, and 20% DI water | 7867 | 4785 | 195 |

TABLE 9-continued

CMP Mixing Ratios, Processes and Results

| | Cu RR | | TaN RR |
|---|---|---|---|
| Slurry Composition Examples 1 through 5 | CMP Process (A) s/pp/ts/ss 5/2/90/90 | CMP Process (B) s/pp/ts/ss 3/2/75/75 | CMP Process (C) s/pp/ts/ss 3/2/75/75 |
| 2) 60% of Oxidizer E, 20% of Abrasive B, 0.5% $NH_2NH_2$ and 19.5% DI water (pH approximately 3) | 4648 | 2557 | 182 |
| 3) 60% of Oxidizer E, 20% of Abrasive B, 0.25% $NH_2NH_2$ and 19.75% DI water (pH approximately 3) | 6001 | 3444 | 193 |
| 4) 30% of CMP 9011, 20% of Abrasive B, 0.5% of $H_2O_2$ 5% Benzotriazole (@ 0.2% solution) and 44.5% DI water | 586 | 183 | 185 |

TABLE 9-continued

CMP Mixing Ratios, Processes and Results

| | Cu RR | | TaN RR |
|---|---|---|---|
| | CMP Process (A) | CMP Process (B) | CMP Process (C) |
| Slurry Composition Examples 1 through 5 | s/pp/ts/ss 5/2/90/90 | s/pp/ts/ss 3/2/75/75 | s/pp/ts/ss 3/2/75/75 |
| 5) 4.8% Hydroxylamine (@ 50% solution), 3.0% Hydroxylamine Sulfate (solid), 5.0% $NH_2NH_2$, 4.2% $H_2SO_4$, 20% of Abrasive B, and 63.0% DI water | 7028 | 3833 | 179 |

The CMP 9011 listed in Table 9 is composed of the following components: Hydroxylamine Nitrate (@ 82% solution) 1.23%; 0.2% Aqueous BTA 8%; Nitric Acid 0.006%; and DI Water 90.764%

FIG. 1 shows a graph of the removal rates ("RR", in angstroms per minute) for each of the three processes A, B, C, associated with each of the five examples. Specifically, FIG. 1 shows five bar graph groups each comprised of three abutting removal rate bar graphs. The five bar graph groups show the five examples from left to right, with the first example starting on the left and the fifth example ending on the right. Each of the abutting bar graphs in each of the five bar graph groups (from left to right in FIG. 1) respectively represents the removal rate for each of the three processes (from left to right in the above table).

In further embodiments, the present invention includes slurry compositions comprising Oxidizer E. Table 10 delineates static etching rate (in angstroms per minute) at room temperature for eight specific examples of slurry compositions in accordance with some embodiments of the present invention and further delineates composition concentrations (mixing ratios) for the eight respective examples.

TABLE 10

Static Etching Rate For Phase I Copper CMP Slurry Compositions
+(−) etch rate indicates removal (deposit) of material.

| Slurry Composition (DI water is added to balance each slurry composition to equal a total of 100 Weight Percent) | Copper Removal Rate |
|---|---|
| 1) 60% of Oxidizer E, 10% of Abrasive B | 50.6 |
| 2) 60% of Oxidizer E, 20% of Abrasive B | 84.5 |
| 3) 60% of Oxidizer E, 20% of Abrasive B, 1.0% $NH_2NH_2$ (pH approximately 3) | 7 |
| 4) 60% of Oxidizer E, 20% of Abrasive B, 0.5% $NH_2NH_2$ (pH approximately 3) | 45 |
| 5) 20% of Abrasive B, 0.6% $H_2O_2$, 30% of a solution ("Solution A") comprised of: 90.764% DI water, 1.23% HAN at 82%, 8% Benzotriazole (@ 0.2% solution), 0.006% Nitric Acid and having a pH of about 2.3 to about 2.7 | 55.5 |
| 6) 20% of Abrasive B, 0.6% $H_2O_2$, 5% Benzotriazole (@ 0.2% solution) and 30% of Solution A | 0 |
| 7) 0.6% of $H_2O_2$, 20% of Abrasive B, 5% Benzotriazole (@ 0.2% solution) and 30% of Solution A | 0 |
| 8) 60% of Oxidizer E, 30% of Abrasive B | 85.4 |

Copper CMP Slurry Compositions Comprising Oxidizer F

In further embodiments, the present invention includes slurry compositions including Oxidizer F. The following table delineates fourteen specific examples of slurry compositions in accordance with some embodiments of the present invention and further delineates composition concentrations (mixing ratios), some comparison etch rate data between using a DI water for the balance of the slurry verses using Abrasive B.

Copper CMP Slurry Composition ("Slurry 9 Composition")

In another embodiment, the present invention is comprised of Oxidizer F and Abrasive B mixed to form a Slurry 9 Composition. In one example, and according to some embodiments of the present invention, the mixing ratio, process, removal rate data, and the static etch rate for the Slurry 9 Composition is shown in Table 11.

TABLE 11

Slurry 9 Composition: Mixing Ratio, Process and Removal Rate

| Slurry 9 Composition | Process (A) 5/0/90/90 | | Process (B) 3/0/75/75 | | Static Etching Rate (C) |
|---|---|---|---|---|---|
| (DI water is added to balance each slurry composition to equal a total of 100 Weight Percent) | Cu Removal Rate (A/min) | WIWNU % | Cu Removal Rate (A/min) | TaN Removal Rate (A/min) | Removal Rate (A/min) @ 130 Degrees Fahrenheit |
| 3.0% Hydroxylamine Sulfate (solid) (HAS); 4.8% Hydroxylamine (@ 50% solution) (HDA); 4.2% Sulfuric acid $H_2SO_4$ (@ 95–98% acid); 0.2% Hydrazine (99%) ($NH_2NH_2$); 0.03% 4-hydrazine benzoic acid (solid) (HBA); 20% of Abrasive B (pH approximately 3) | 9112 | 3.2% | 4235 | 200 | 178 |

Process(A) in Table 11 with respect to the Slurry 9 Composition is achieved by applying 5 psi down force pressure, 0 psi back pressure, 90 rpm table speed (22.5 inch diameter) and 90 rpm carrier speed (8 inch diameter). The Slurry 9 Composition, when employed according to the above first process, provides a copper removal rate of 9112 angstroms per minute and a copper within-wafer-nonuniformity (WIWNU %) of approximately 3.2%.

Process(B) in Table 11 with respect to the Slurry 9 Composition is achieved by applying 3 psi down force pressure, 0 psi back pressure, 75 rpm table speed (22.5 inch diameter) and 75 rpm carrier speed (8 inch diameter). The Slurry 9 Composition, when employed according to the above second process, provides a Cu:TaN selectivity of approximately 21.2.

That static etch rate for the Slurry 9 Composition is 178 angstroms per minute.

Copper CMP Slurry Compositions Comprising Oxidizer G

In further embodiments, the present invention includes slurry compositions comprised of Oxidizer G. Tables 12, 13 and 14 delineate further specific examples of slurry compositions in accordance with the present invention and further delineate composition concentrations (mixing ratios), processes, removal rate data, and the static etch rates.

TABLE 12

| Slurry 10 Composition | Process(A) 5/0/90/90 | | Process(B) 3/0/75/75 | | Static Etching Rate(C) |
|---|---|---|---|---|---|
| (DI water is added to balance each slurry composition to equal a total of 100 Weight Percent) | Cu Removal Rate (A/min) | WIWNU % | Cu Removal Rate (A/min) | TaN Removal Rate (A/min) | Removal Rate (A/min) @ 130 Degrees Fahrenheit |
| 2.4% Hydroxylamine Sulfate (solid) (HAS); 5.6% Hydroxylamine (@ 50% solution) (HDA); 3.2% Sulfuric acid $H_2SO_4$ (@ 95–98% acid); 0.06% Hydrazine (99%) ($NH_2NH_2$); 0.032% 4-hydrazine benzoic acid (solid) (HBA); 1.5% CR-30; and 1% CR-140 (pH approximately 2) | 8559 | 2.9% | 4642 | 124 | 113 |

CR-30 and CR-140 are milled alumina products manufactured by Baikowski Chimie Co. of Annecy Cedex 9, France. The numerical designation correlates with the particle size, larger numerical designations having generally smaller particles than smaller numerical designations. That is, particles sizes are typically in the order CR-140<CR-85<CR-30.

TABLE 13

| Slurry 11 Composition | Process(A) 5/0/90/90 | | Process(B) 3/0/75/75 | | Static Etching Rate(C) |
|---|---|---|---|---|---|
| (DI water is added to balance each slurry composition to equal a total of 100 Weight Percent) | Cu Removal Rate (A/min) | WIWNU % | Cu Removal Rate (A/min) | TaN Removal Rate (A/min) | Removal Rate (A/min) @ 130 Degrees Fahrenheit |
| 2.4% Hydroxylamine Sulfate (solid) (HAS); 5.6% Hydroxylamine (@ 50% solution) (HDA); 3.2% Sulfuric acid $H_2SO_4$ (@ 95–98% acid); 0.1% Hydrazine (99%) ($NH_2NH_2$); 0.032% 4-hydrazine benzoic acid (solid) (HBA); 1.5% CR-30; and 1% CR-140 (pH approximately 2) | 8893 | 3.9% | 3000 | 123 | 200 |

TABLE 14

| Slurry 12 Composition | Process(A) 5/0/90/90 | | Process(B) 3/0/75/75 | | Static Etching Rate(C) |
|---|---|---|---|---|---|
| (DI water is added to balance each slurry composition to equal a total of 100 Weight Percent) | Cu Removal Rate (A/min) | WIWNU % | Cu Removal Rate (A/min) | TaN Removal Rate (A/min) | Removal Rate (A/min) @ 130 Degrees Fahrenheit |
| 2.1% Hydroxylamine Sulfate (solid) (HAS); 4.2% Hydroxylamine (@ 50% solution) (HDA); 3.85% Sulfuric acid $H_2SO_4$ (@ 95–98% acid); 0.07% Hydrazine (99%) ($NH_2NH_2$); 0.032% 4-hydrazine benzoic acid (solid) (HBA); 2.1% CR-30; and 2% CR-140 (pH approximately 2) | 8590 | 4.6% | 4600 | 130 | 189 |

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

We claim:

1. A composition for chemical mechanical planarization of a surface having at least one feature thereon comprising copper, comprising:
   hydroxylamine in an amount sufficient for chemical etching of the at least one feature comprising copper;
   a material selected from the group consisting of hydroxylamine nitrate, hydroxylamine sulfate, an ammonium salt, and any combination thereof, the ammonium salt selected from the group consisting of a nitrate salt, a sulfate salt, a phosphate salt, a chloride salt, and any combination thereof; and
   an abrasive;
   wherein a pH of the composition is in a range of from approximately 2.0 to approximately 5.0.

2. The composition of claim 1, wherein the amount of hydroxylamine is from approximately 0.3 to approximately 10 percent by weight.

3. The composition of claim 1, wherein the material comprises hydroxylamine nitrate in an amount of from approximately 0.1 to approximately 3 percent by weight.

4. The composition of claim 1, wherein the material comprises hydroxylamine sulfate in an amount of from approximately 0.001 to approximately 12 percent by weight.

5. The composition of claim 1, wherein the amount of hydroxylamine is from approximately 0.3 to approximately 10 percent by weight, and the material comprises hydroxylamine nitrate in an amount of from approximately 0.1 to approximately 3 percent by weight and hydroxylamine sulfate in an amount of from approximately 0.001 to approximately 12 percent by weight.

6. The composition of claim 1, wherein the material comprises an ammonium salt selected from the group consisting of a nitrate salt, a sulfate salt, a phosphate salt, a chloride salt, and any combination thereof.

7. The composition of claim 1, further comprising a material selected from a the group consisting of a free radical inhibitor, an insoluble complexing agent, a soluble complexing agent, and any combination thereof.

8. The composition of claim 7, wherein the free radical inhibitor is selected from the group consisting of hydrazine, hydrazine derivatives, hydrazine salts, hydrazid, hydrazid derivatives, and any combination thereof, in an amount sufficient to inhibit the formation of free radicals in the composition.

9. The composition of claim 7, wherein the free radical inhibitor comprises 4-hydrazine benzoic acid.

10. The composition of claim 7, wherein the insoluble complexing agent is selected from the group consisting of benzotriazole, 6-dioxaspirol [4,4] nonane 2,7-dione, dioximes, and any combination thereof.

11. The composition of claim 7, wherein the insoluble complexing agent comprises 2,4-pentanedione dioxime.

12. The composition of claim 7, wherein the soluble complexing agent is selected from the group consisting of citric acid, copper-complexing catechol derivatives, copper-complexing alpha organic acids, copper-complexing hydroxamic acids, copper-complexing amino acids, copper-complexing dicarboxylic acids, and any combination thereof.

13. The composition of claim 1, wherein the abrasive is selected from the group consisting of silica, alumina, ceria, titania, zirconia, and any combination thereof.

14. The composition of claim 1, wherein the abrasive comprises colloidal silica.

15. The composition of claim 1, wherein the abrasive comprises milled alumina.

16. A composition for chemical mechanical planarization comprising hydroxylamine in an amount sufficient for chemical etching; a material selected from the group consisting of hydroxylamine nitrate, hydroxylamine sulfate, an ammonium salt, and any combination thereof, the ammonium salt selected from the group consisting of a nitrate salt, a sulfate salt, a phosphate salt, a chloride salt, and any combination thereof; and 4-hydrazine benzoic acid.

17. The composition of claim 16, wherein the amount of hydroxylamine is from approximately 0.3 to approximately 10 percent by weight.

18. The composition of claim 16, wherein the material comprises hydroxylamine nitrate in an amount of from approximately 0.1 to approximately 3 percent by weight.

19. The composition of claim 16, wherein the material comprises hydroxylamine sulfate in an amount of from approximately 0.001 to approximately 12 percent by weight.

20. The composition of claim 16, wherein the amount of hydroxylamine is from approximately 0.3 to approximately 10 percent by weight, and the material comprises hydroxylamine nitrate in an amount of from approximately 0.1 to approximately 3 percent by weight and hydroxylamine sulfate in an amount of from approximately 0.001 to approximately 12 percent by weight.

21. The composition of claim 16, wherein the material comprises an ammonium salt selected from the group consisting of a nitrate salt, a sulfate salt, a phosphate salt, a chloride salt, and any combination thereof.

22. The composition of claim 16, further comprising a material selected from the group consisting of a free radical inhibitor, an insoluble complexing agent, a soluble complexing agent, and any combination thereof.

23. The composition of claim 22, wherein the free radical inhibitor is selected from the group consisting of hydrazine, hydrazine derivatives other than 4-hydrazine benzoic acid, hydrazine salts, hydrazid, hydrazid derivatives, and any combination thereof, in an amount sufficient to inhibit the formation of free radicals in the composition.

24. The composition of claim 22, wherein the insoluble complexing agent is selected from the group consisting of benzotriazole, 1,6-dioxaspirol [4,4] nonane 2,7-dione, dioximes, and any combination thereof.

25. The composition of claim 22, wherein the insoluble complexing agent comprises 2,4-pentanedione dioxime.

26. The composition of claim 22, wherein the soluble complexing agent is selected from the group consisting of citric acid, copper-complexing catechol derivatives, copper-complexing alpha organic acids, copper-complexing hydroxamic acids, copper-complexing amino acids, copper-complexing dicarboxylic acids, and any combination thereof.

27. The composition of claim 16, further comprising an abrasive.

28. The composition of claim 16, wherein the abrasive is selected from the group consisting of silica, alumina, ceria, titania, zirconia, and any combination thereof.

29. The composition of claim 16, wherein the abrasive comprises colloidal silica.

30. The composition of claim 16, wherein the abrasive comprises milled alumina.

31. The composition of any one of claims 16–21, wherein a pH of the composition is in a range of from approximately 2.0 to approximately 5.0.

32. A composition for chemical mechanical planarization of a surface having at least one feature thereon comprising copper, comprising:

hydroxylamine in an amount sufficient for chemical etching of the at least one feature comprising copper;

a material selected from the group consisting of hydroxylamine nitrate, hydroxylamine sulfate, an ammonium salt, and any combination thereof, the ammonium salt selected from the group consisting of a nitrate salt, a sulfate salt, a phosphate salt, a chloride salt, and any combination thereof; and an abrasive comprising alumina.

33. The composition of claim 32, wherein the amount of hydroxylamine is from approximately 0.3 to approximately 10 percent by weight.

34. The composition of claim 32, wherein the material comprises hydroxylamine nitrate in an amount of from approximately 0.1 to approximately 3 percent by weight.

35. The composition of claim 32, wherein the material comprises hydroxylamine sulfate in an amount of from approximately 0.001 to approximately 12 percent by weight.

36. The composition of claim 32, wherein the amount of hydroxylamine is from approximately 0.3 to approximately 10 percent by weight, and the material comprises hydroxylamine nitrate in an amount of from approximately 0.1 to approximately 3 percent by weight and hydroxylamine sulfate in an amount of from approximately 0.001 to approximately 12 percent by weight.

37. The composition of claim 32, wherein the material comprises an ammonium salt selected from the group consisting of a nitrate salt, a sulfate salt, a phosphate salt, a chloride salt, and any combination thereof.

38. The composition of claim 32, further comprising a material selected from the group consisting of a free radical inhibitor, an insoluble complexing agent, a soluble complexing agent, and any combination thereof.

39. The composition of claim 38, wherein the free radical inhibitor is selected from the group consisting of hydrazine, hydrazine derivatives, hydrazine salts, hydrazid, hydrazid derivatives, and any combination thereof, in an amount sufficient to inhibit the formation of free radicals in the composition.

40. The composition of claim 38, wherein the free radical inhibitor comprises 4-hydrazine benzoic acid.

41. The composition of claim 38, wherein the insoluble complexing agent is selected from the group consisting of benzotriazole, 1,6-dioxaspirol [4,4] nonane 2,7-dione, dioximes, and any combination thereof.

42. The composition of claim 38, wherein the insoluble complexing agent comprises 2,4-pentanedione dioxime.

43. The composition of claim 38, wherein the soluble complexing agent is selected from the group consisting of citric acid, copper-complexing catechol derivatives, copper-complexing alpha organic acids, copper-complexing hydroxamic acids, copper-complexing amino acids, copper-complexing dicarboxylic acids, and any combination thereof.

44. The composition of claim 32, wherein the abrasive comprises milled alumina.

45. The composition of claim 32, wherein a pH of the composition is in a range of from approximately 2.0 to approximately 5.0.

* * * * *